(12) United States Patent
Hidaka et al.

(10) Patent No.: US 10,790,732 B2
(45) Date of Patent: Sep. 29, 2020

(54) POLE-NUMBER-CHANGING ROTARY ELECTRIC MACHINE AND DRIVING METHOD OF POLE-NUMBER-CHANGING ROTARY ELECTRIC MACHINE

(71) Applicant: MITSUBISHI ELECTRIC CORPORATION, Chiyoda-ku (JP)

(72) Inventors: Yuki Hidaka, Chiyoda-ku (JP); Taiga Komatsu, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/306,678

(22) PCT Filed: Jul. 4, 2016

(86) PCT No.: PCT/JP2016/069765
§ 371 (c)(1),
(2) Date: Dec. 3, 2018

(87) PCT Pub. No.: WO2018/008057
PCT Pub. Date: Jan. 11, 2018

(65) Prior Publication Data
US 2019/0334420 A1    Oct. 31, 2019

(51) Int. Cl.
*H02P 6/12*      (2006.01)
*H02K 17/14*   (2006.01)
(Continued)

(52) U.S. Cl.
CPC .............. *H02K 17/14* (2013.01); *H02P 25/20* (2013.01); *H02P 25/22* (2013.01); *H02K 1/16* (2013.01)

(58) Field of Classification Search
CPC .......... H02K 17/14; H02K 1/16; H02P 25/20; H02P 25/22; Y02T 10/641
See application file for complete search history.

(56) References Cited

U.S. PATENT DOCUMENTS 5,977,679 A * 11/1999 Miller .................... H02K 1/165
                                                            310/164
2010/0019714 A1* 1/2010 Fuchs ........................ H02P 1/38
                                                            318/524

(Continued)

FOREIGN PATENT DOCUMENTS

DE    10 2006 024 520 B4    12/2010
DE    10 2014 226 570 A1    6/2016
(Continued)

OTHER PUBLICATIONS

International Search Report dated Sep. 13, 2016 in PCT/JP2016/069765 Filed on Jul. 4, 2016.
(Continued)

*Primary Examiner* — Muhammad S Islam
(74) *Attorney, Agent, or Firm* — Xsensus LLP

(57) ABSTRACT

Provided is a pole-number-changing rotary electric machine having excellent torque-current characteristics both at a more-pole drive time and at a less-pole drive time without use of a winding changing mechanism. The pole-number-changing rotary electric machine is configured to change a number of poles between the more-pole drive time and the less-pole drive time, and includes: a rotary electric machine including: a stator including stator slots arranged in a mechanical angle direction; and a rotor configured to be rotated by magnetomotive forces generated by currents flowing through stator coils stored in the stator slots; an inverter configured to supply an m-phase current to the stator coils; and a control unit configured to control the inverter, the per-stator-slot magnetomotive forces being arranged at regular angle intervals.

10 Claims, 7 Drawing Sheets

(51) Int. Cl.
*H02P 25/20* (2006.01)
*H02P 25/22* (2006.01)
*H02K 1/16* (2006.01)

(56) References Cited

U.S. PATENT DOCUMENTS

| | | |
|---|---|---|
| 2012/0007461 A1 | 1/2012 | Wang et al. |
| 2014/0217946 A1* | 8/2014 | Kume ............... H02P 25/188 |
| | | 318/497 |
| 2017/0366129 A1* | 12/2017 | Hidaka ............... H02P 27/06 |

FOREIGN PATENT DOCUMENTS

| | | |
|---|---|---|
| JP | 07-336971 A | 12/1995 |
| JP | 11-18382 A | 1/1999 |
| JP | 2011-018382 A | 1/2011 |
| JP | 2013-34317 A | 2/2013 |
| JP | 2014-168331 A | 9/2014 |
| JP | 2015-226425 A | 12/2015 |
| WO | 2015/121960 A1 | 8/2015 |

OTHER PUBLICATIONS

Office Action dated Jun. 9, 2020 in German Patent Application No. 11 2016 007 043.8, 12 pages.

* cited by examiner

POLE-NUMBER-CHANGING ROTARY ELECTRIC MACHINE AND DRIVING METHOD OF POLE-NUMBER-CHANGING ROTARY ELECTRIC MACHINE

TECHNICAL FIELD

The present invention relates to a pole-number-changing rotary electric machine configured to be driven by changing the number of poles in order to ensure high torque performance and high output performance over a wide rotation range, and a driving method of a pole-number-changing rotary electric machine.

BACKGROUND ART

As a rotary electric machine for use in an electric vehicle, a hybrid vehicle, or other such vehicles, there is known a pole-number-changing rotary electric machine configured to be driven by changing the number of poles in order to ensure high torque performance and high output performance over a wide rotation range.

As such a related-art pole-number-changing rotary electric machine, there is a pole-number-changing rotary electric machine including six coils arranged at angle intervals of 60°, which is configured to supply a current to each coil by a six-phase inverter (see, for example, Patent Literature 1). In Patent Literature 1, the six-phase inverter is used to change the current phase of each coil, to thereby change the number of poles.

As another related-art pole-number-changing rotary electric machine, there is a pole-number-changing rotary electric machine configured such that stator coils wound by distributed winding for three-phase drive are connected to two three-phase inverters alternately every other pole pair so that a distributed winding coefficient $k_{wd}$ satisfies $k_{wd}=\sin(\pi/6)/(q \times \sin(\pi/6q))$, where the number of slots per each pole and each phase at a more-pole drive time (a time when a larger number of poles are driven) is represented by "q" (see, for example Patent Literature 2). In Patent Literature 2, an inter-group phase difference between the two three-phase inverters is controlled within a range of from 0° to 180° so as to set less poles at the time of 0° and more poles at the time of 180°, to thereby change the number of poles.

CITATION LIST

Patent Literature

[PTL 1] JP 11-018382 A
[PTL 2] JP 2015-226425 A

SUMMARY OF INVENTION

Technical Problem

However, the related arts have the following problems.
In the pole-number-changing rotary electric machine in Patent Literature 1, a winding changing mechanism for changing the number of poles is required. However, transient torque pulsation occurs when the number of poles is changed by the winding changing mechanism, which leads to a problem in that a mechanism for suppressing an occurrence of torque pulsation is further required.

Further, in Patent Literature 2, at a less-pole drive time (a time when a smaller number of poles are driven), a distributed winding coefficient is lowered, which leads to a problem in that torque-current characteristics are lowered.

The present invention has been made in order to solve the above-mentioned problems, and has an object to obtain a pole-number-changing rotary electric machine having excellent torque-current characteristics both at a more-pole drive time and at a less-pole drive time without use of a winding changing mechanism, and a driving method of a pole-number-changing rotary electric machine.

Solution to Problem

According to one embodiment of the present invention, there is provided a pole-number-changing rotary electric machine, which is configured to change a number of poles between a more-pole drive time and a less-pole drive time, the pole-number-changing rotary electric machine including: a rotary electric machine including: a stator including stator slots arranged in a mechanical angle direction; and a rotor configured to be rotated by magnetomotive forces generated by currents flowing through stator coils stored in the stator slots; an inverter configured to supply an m-phase current to the stator coils; and a control unit configured to control the inverter, the per-stator-slot magnetomotive forces being arranged at regular angle intervals, wherein the control unit is configured to: change the number of poles so that a ratio between the number of poles at the more-pole drive time and the number of poles at the less-pole drive time becomes $(2n+1):1$; and control a current phase so that a degree of freedom in current phase, which is a number of different current phases per pole, becomes $m/(2n+1)$ at the more-pole drive time and "m" at the less-pole drive time, where "m" represents a natural number that is a multiple of 3 and is equal to or larger than 6, "n" represents a natural number, and $m/(2n+1)$ is equal to or larger than 2.

According to one embodiment of the present invention, there is provided a driving method of a pole-number-changing rotary electric machine, which is configured to change a number of poles between a more-pole drive time and a less-pole drive time, the pole-number-changing rotary electric machine including: a rotary electric machine including: a stator including stator slots arranged in a mechanical angle direction; and a rotor configured to be rotated by magnetomotive forces generated by currents flowing through stator coils stored in the stator slots; an inverter configured to supply an m-phase current to the stator coils; and a control unit configured to control the inverter, the per-stator-slot magnetomotive forces being arranged at regular angle intervals, the method including a current supplying step of supplying, by the control unit, an m-phase current to the stator coil through use of the inverter, wherein the current supplying step includes: changing the number of poles so that a ratio between the number of poles at the more-pole drive time and the number of poles at the less-pole drive time becomes $(2n+1):1$; controlling a current phase so that a degree of freedom in current phase, which is a number of different current phases per pole, becomes $m/(2n+1)$ at the more-pole drive time; and controlling the current phase so that the degree of freedom in current phase becomes "m" at the less-pole drive time, where "m" represents a natural number that is a multiple of 3 and is equal to or larger than 6, "n" represents a natural number, and $m/(2n+1)$ is equal to or larger than 2.

Advantageous Effects of Invention

With the pole-number-changing rotary electric machine according to the one embodiment of the present invention, the number of poles is changed so that the ratio between the number of poles at the more-pole drive time and the number of poles at the less-pole drive time becomes (2n+1):1, while the current phase is controlled so that the degree of freedom in current phase, which is the number of different current phases per pole, becomes m/(2n+1) at the more-pole drive time and becomes "m" at the less-pole drive time, where "m" represents a natural number that is a multiple of 3 and is equal to or larger than 6, "n" represents a natural number, and m/(2n+1) is equal to or larger than 2.

Therefore, it is possible to obtain the pole-number-changing rotary electric machine having excellent torque-current characteristics both at a more-pole drive time and at a less-pole drive time without use of a winding changing mechanism, and the driving method of a pole-number-changing rotary electric machine.

DESCRIPTION OF EMBODIMENTS

A description is now given of a pole-number-changing rotary electric machine and a driving method of a pole-number-changing rotary electric machine according to preferred embodiments of the present invention referring to the accompanying drawings, and throughout the drawings, like or corresponding components are denoted by like reference symbols to describe those components.

First Embodiment

Figure 1:
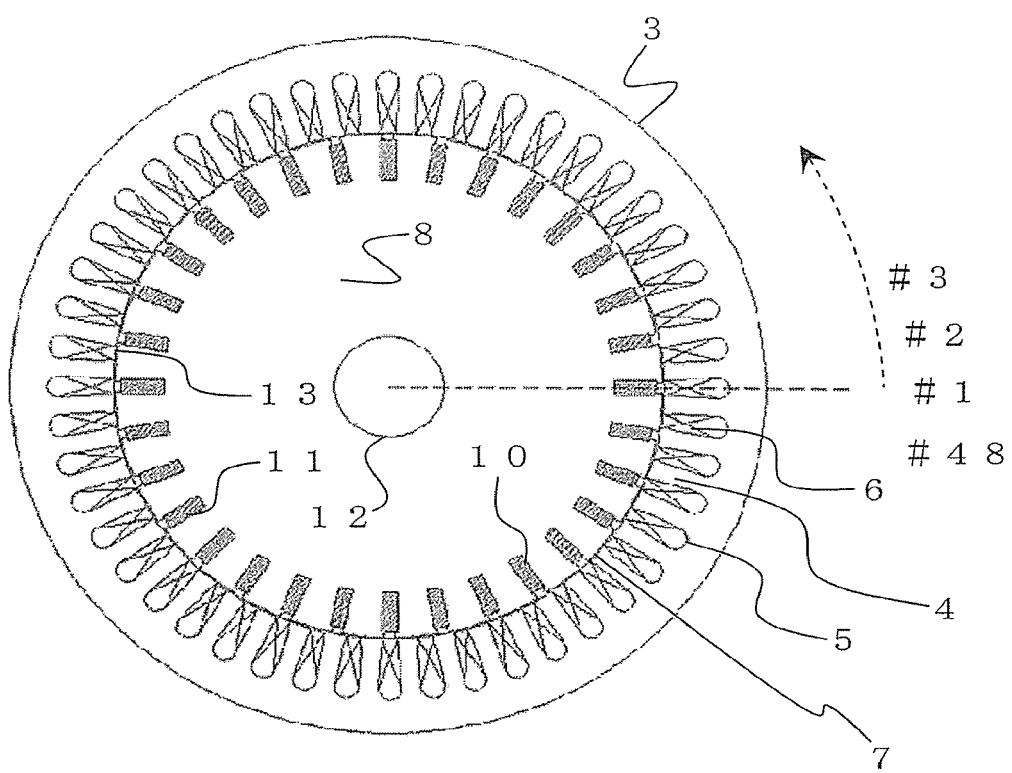
FIG. 1 is a sectional view of a rotary electric machine for achieving the changing of the number of poles between twelve poles and four poles in a pole-number-changing rotary electric machine according to a first embodiment of the present invention.

First, a description is given of a configuration of a pole-number-changing rotary electric machine according to a first embodiment of the present invention. FIG. 1 is a sectional view of a rotary electric machine for achieving the changing of the number of poles between twelve poles and four poles in the pole-number-changing rotary electric machine according to the first embodiment of the present invention.

A rotary electric machine 1 is formed of a stator 3 and a rotor 7. FIG. 1 is an illustration of an example in which the rotary electric machine 1 is an induction machine, but the rotary electric machine 1 is not limited to the induction machine. For example, the rotary electric machine 1 may be a permanent magnet type synchronous rotary machine or a field winding type synchronous rotary machine.

The stator 3 of the rotary electric machine 1 illustrated in FIG. 1 has a cylindrical shape. In the inner periphery of the stator 3, forty-eight stator slots 5 identified by slot numbers #1 to #48 are arranged at regular angle intervals in a mechanical angle direction. In the stator slot 5, a stator coil 6 is stored. A stator tooth 4 is formed between each pair of adjacent stator slots 5.

The rotor 7 of the rotary electric machine 1 illustrated in FIG. 1 has a cylindrical shape, and includes a rotor core 8. Inside the stator 3, the rotor 7 is rotated about a shaft passing through a shaft hole 12, which is used as a rotation axis, by a magnetomotive force generated by a current flowing through the stator coil 6.

In the outer periphery of the rotor 7, rotor slots 10 are arranged at regular angle intervals in a mechanical angle direction. In the rotor slot 10, a secondary conductor 11 is stored. There is a rotation clearance 13 between the stator 3 and the rotor 7. The rotary electric machine 1 is driven by a twelve-phase inverter (not shown).

Figure 2:
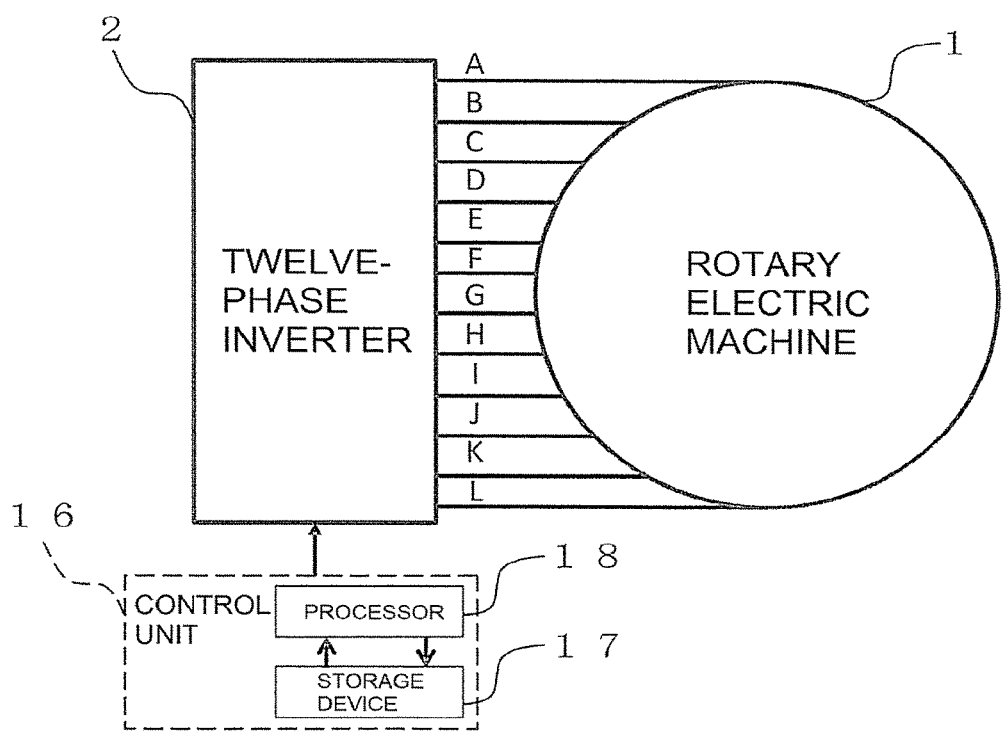
FIG. 2 is a schematic diagram for illustrating a method for wiring connection between the rotary electric machine and an inverter in the pole-number-changing rotary electric machine according to the first embodiment of the present invention.

FIG. 2 is a schematic diagram for illustrating a method for wiring connection between a rotary electric machine and an inverter in the pole-number-changing rotary electric machine according to the first embodiment of the present invention. In FIG. 2, the pole-number-changing rotary electric machine includes the rotary electric machine 1 and a twelve-phase inverter 2. The twelve-phase inverter 2 supplies current to corresponding stator coils 6 of the rotary electric machine 1.

The stator coils 6 of the rotary electric machine 1 in the first embodiment of the present invention include twelve draw-out ports as illustrated in FIG. 2, and currents having corresponding phases A to L are supplied from the twelve-phase inverter 2. In the following description, the phases A to L are referred to as "current phases". The twelve-phase inverter 2 is controlled by a control unit 16.

The control unit 16 includes, as hardware components, a storage device 17 having a program stored therein and a processor 18 configured to execute a program stored in the storage device 17. The control unit 16 is implemented as a processing circuit, for example, a system LSI.

The storage device 17 includes: a random access memory or other such volatile storage device; and a flash memory, a hard disk drive, or other such nonvolatile auxiliary storage device. The processor 18 executes the program stored in the storage device 17. The storage device 17 includes the volatile storage device and the auxiliary storage device, and hence the processor 18 receives the program as input from the auxiliary storage device via the volatile storage device.

The processor 18 may output data on, for example, a calculation result to the volatile storage device of the storage device 17, or may store the data in the auxiliary storage device via the volatile storage device. As the control unit 16, a plurality of processors 18 and a plurality of storage devices 17 may cooperate to execute the above-mentioned function, or a plurality of processing circuits may cooperate to execute the above-mentioned function. Meanwhile, a plurality of processors 18, a plurality of storage devices 17, and a plurality of processing circuits may cooperate to execute the above-mentioned function in combination.

Figure 3:
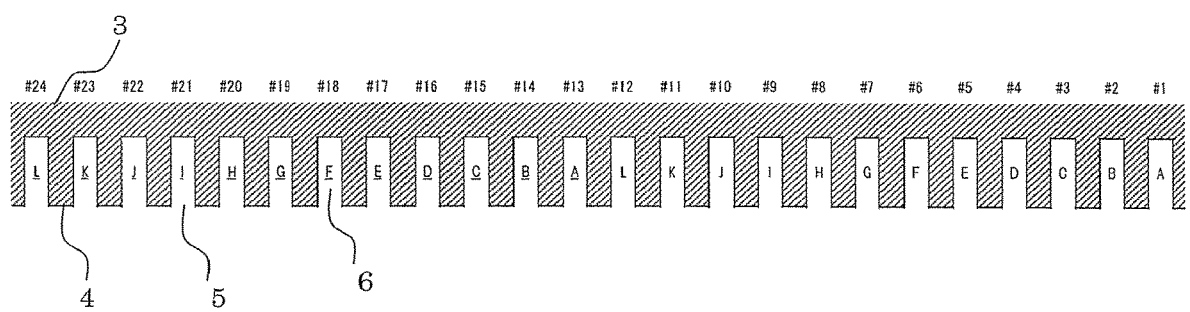
FIG. 3 is a schematic diagram for illustrating a current phase arrangement of stator coils corresponding to twenty-four slots in the pole-number-changing rotary electric machine according to the first embodiment of the present invention.

FIG. 3 is a schematic diagram for illustrating a current phase arrangement of stator coils corresponding to twenty-four slots in the pole-number-changing rotary electric machine according to the first embodiment of the present invention. In the stator 3, the stator slots 5 having the number of stator slots being 48 are arranged at regular angle intervals in the mechanical angle direction, and the stator coil 6 is stored in each of the stator slots 5. The stator tooth 4 is formed between each pair of adjacent stator slots 5.

FIG. 3 is an illustration of the current phase arrangement of the stator slots 5 identified by slot numbers #1 to #24 among the stator slots 5 identified by slot numbers #1 to #48. In FIG. 3, an underlined current phase means that the winding direction of the stator coil 6 is reverse to that in a case of a current phase that is not underlined. The stator coils 6 corresponding to the phases A to L are connected to one another by Y-connection, Δ-connection, or other such connection. In another case, twelve single-phase coils may be provided with all the twelve phases being made independent of one another.

In an actual case, the stator slots 5 are often divided into ones located on an outer diameter side of the stator 3 and ones located on an inner diameter side of the stator 3, and the stator coils 6 having mutually different current phases are often stored in the outer diameter side and inner diameter side of the stator 3. In FIG. 3, only the current phases of the stator coils 6 located on the outer diameter side are illustrated. Further, the twelve-phase inverter 2 performs control to change the current phases so as to have appropriate values when a change is made between the more-pole drive and the less-pole drive.

Next, a description is given of an operation of the pole-number-changing rotary electric machine according to the first embodiment of the present invention. Table 1 is a table for showing an order of current phases of currents supplied to the rotary electric machine 1 by the twelve-phase inverter 2 in the pole-number-changing rotary electric machine according to the first embodiment of the present invention.

TABLE 1

|  | Current phase at more-pole drive time | Current phase at less-pole drive time |
| --- | --- | --- |
| Phase-A current | 0° | 0° |
| Phase-B current | 45° | 15° |
| Phase-C current | 90° | 30° |
| Phase-D current | 135° | 45° |
| Phase-E current | 180° | 60° |
| Phase-F current | 225° | 75° |
| Phase-G current | 270° | 90° |
| Phase-H current | 315° | 105° |
| Phase-I current | 360° | 120° |
| Phase-J current | 405° | 135° |
| Phase-K current | 450° | 150° |
| Phase-L current | 495° | 165° |

Figure 4:
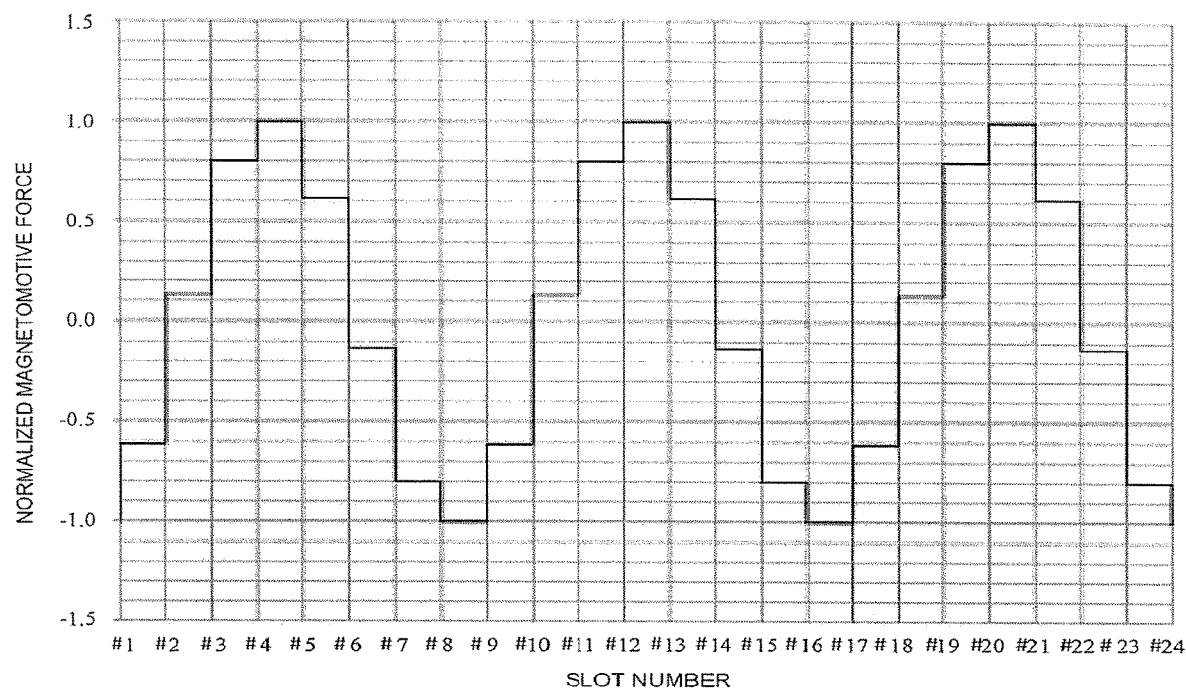
FIG. 4 is a schematic graph for showing a magnetomotive force waveform corresponding to the twenty-four slots at a more-pole drive time in the pole-number-changing rotary electric machine according to the first embodiment of the present invention.
Figure 5:
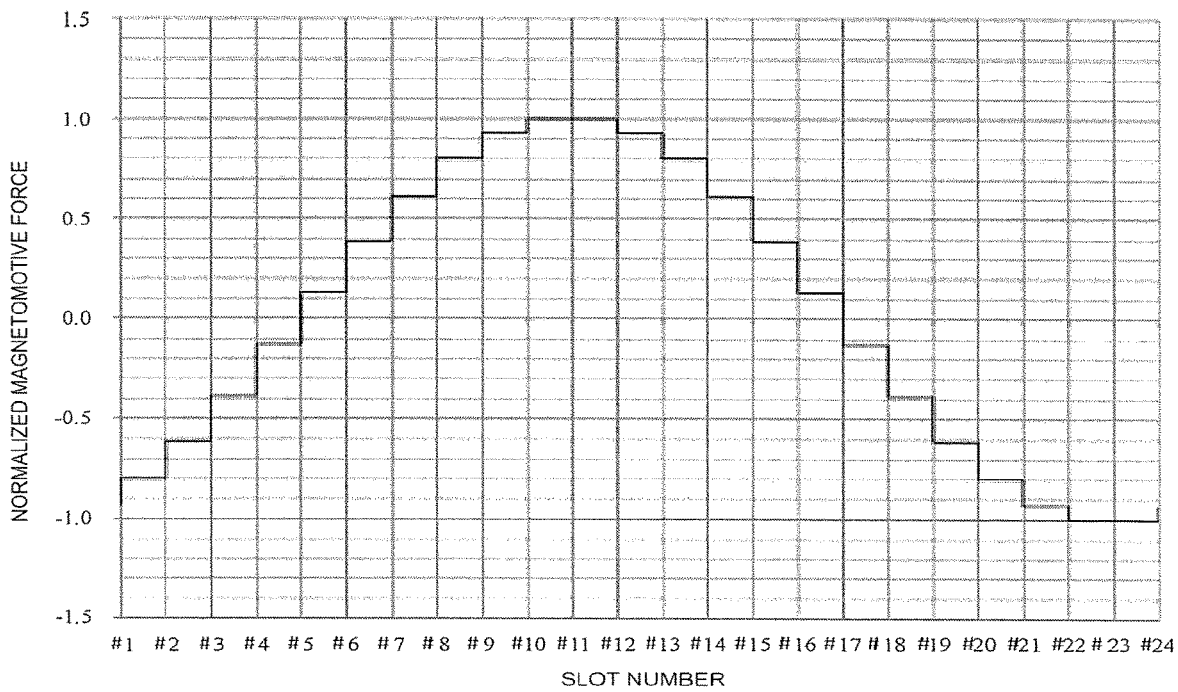
FIG. 5 is a schematic graph for showing a magnetomotive force waveform corresponding to the twenty-four slots at a less-pole drive time in the pole-number-changing rotary electric machine according to the first embodiment of the present invention.

Magnetomotive force waveforms obtained when the current phases are controlled based on Table 1 are shown in FIG. 4 and FIG. 5. When a spatial order for a slot half cycle (#1 to #24) is represented by "k" (where "k" represents a natural number), it is understood that the magnetomotive force waveform at a more-pole drive time (at a time when a larger number of poles are driven) shown in FIG. 4 exhibits a waveform including mainly a spatial order of 3k, while the magnetomotive force waveform at a less-pole drive time (at a time when a smaller number of poles are driven) shown in FIG. 5 exhibits a waveform including mainly a spatial order of "k". This enables the number of poles to be changed so as to satisfy a relationship of (more-pole drive time):(less-pole drive time)=3:1.

In the magnetomotive force waveforms shown in FIG. 4 and FIG. 5, all the stator coils 6 in the stator slots 5 have the same number of coil windings, and currents of I×cos(−60°), I×cos(−105°), I×cos(−150°), I×cos(−195°), I×cos(−240°), I×cos(−285°), I×cos(−330°), I×cos(−375°), I×cos(−420°), I×cos(−465°), I×cos(−510°), and I×cos(−555°) are flowing in the phase A, phase B, phase C, phase D, phase E, phase F, phase G, phase H, phase I, phase J, phase K, and phase L, respectively. In short, all the absolute values of the magnetomotive forces per stator slot 5 generated by the stator coils 6 are the same.

The first embodiment of the present invention is described by taking a method of changing the number of poles at a number-of-poles ratio of (more-pole drive time):(less-pole drive time)=3:1, but the number-of-poles ratio is not limited to 3:1. For example, the current phases at the more-pole drive time of the currents in the phases A to L are set to have values that are (2n+1) times (where "n" represents a natural number) larger than those at the less-pole drive time, to thereby be able to achieve the changing of the number of poles so as to satisfy a relationship of (more-pole drive time):(less-pole drive time)=(2n+1):1.

Further, in the first embodiment of the present invention, the number of stator slots is 48, and hence (more poles):(less poles)=(12 poles):(4 poles) is satisfied. The twelve-phase inverter 2 performs control to change the current phases of the currents in the phases A to L so as to achieve the order of the current phases shown in Table 1, to thereby be able to form the magnetomotive forces shown in FIG. 4 and FIG. 5.

Next, a description is given of effects of the pole-number-changing rotary electric machine according to the first embodiment of the present invention. The rotary electric machine 1 in the first embodiment of the present invention, which is illustrated in FIG. 3, includes one stator slot per each pole and each phase. That is, the stator coil 6 corresponding to one current phase is stored per slot.

In addition, electrical angles between adjacent slots can be arranged at regular angle intervals both at the more-pole drive time and at the less-pole drive time, and hence a distributed winding coefficient $k_{wd}$ at the more-pole drive time and less-pole drive time in the first embodiment of the present invention is expressed by Expression (1).

$$k_{wd}=\sin(\pi/6)/(q\times\sin(\pi/6q)) \qquad (1)$$

In Expression (1), in the first embodiment of the present invention, q=1 is satisfied both at the more-pole drive time and at the less-pole drive time, and hence the distributed winding coefficient $k_{wd}$ becomes 1.0 both at the more-pole drive time and at the less-pole drive time.

In this manner, in the first embodiment of the present invention, it is not only possible to achieve the changing of the number of poles so as to satisfy the relationship of (more-pole drive time):(less-pole drive time)=3:1 without use of a winding changing mechanism, but also possible to improve the distributed winding coefficient due to the current phases between adjacent slots arranged evenly in terms of the electrical angle, to thereby improve torque-current characteristics.

In particular, in a hybrid vehicle or other such vehicle configured to propel the vehicle by assisting a driving force of an engine by a motor, a smaller driving force of the engine is required with a larger assist amount by the motor when a driving force of the vehicle is constant, which can improve fuel efficiency performance.

For example, when the vehicle accelerates with a constant driving force from a stopped state or a low-speed traveling state, it is possible to obtain excellent torque-current characteristics by changing the current phases to those for the more-pole drive not only at a low-speed traveling time, at which an engine rotation speed is low, but also at a high-speed traveling time, at which the engine rotation speed is high after the acceleration, to thereby be able to improve the fuel efficiency performance.

Further, the control unit 16 may drive the rotary electric machine 1 by making a change to the more-pole drive at the low-speed traveling time of the vehicle in order to output a torque required for the acceleration of the vehicle, and may drive the rotary electric machine 1 by making a change to the less-pole drive at the high-speed traveling time when the vehicle is driven at a constant speed with a low torque. Under this control, it is possible to increase an operating range of the rotary electric machine 1 expressed by a rotation speed and a torque, which is enabled within a limit of the voltage applied to the rotary electric machine 1 from the twelve-phase inverter 2.

That is, the control unit 16 controls the current phase so as to change the number of poles in accordance with a rotation speed of the rotor 7 of the rotary electric machine 1, to thereby be able to improve the fuel efficiency performance of the vehicle or to increase the operating range of the rotary electric machine 1.

Further, the control unit 16 changes the number of poles so that the ratio between the number of poles at the more-pole drive time and the number of poles at the less-pole drive time becomes (2n+1):1=3:1, and controls the current phase so that a degree of freedom in current phase, which is the number of different current phases per pole, becomes m/(2n+1)=12/(2×1+1)=4 at the more-pole drive time and becomes m=12 at the less-pole drive time, where m=12 represents a natural number that is a multiple of 3 and is equal to or larger than 6, n=1 represents a natural number, and m/(2n+1)=4 is equal to or larger than 2, to thereby be able to obtain a pole-number-changing rotary electric machine having excellent torque-current characteristics without use of a winding changing mechanism.

That is, according to the first embodiment, the number of poles is changed so that the ratio between the number of poles at the more-pole drive time and the number of poles at the less-pole drive time becomes (2n+1):1, while the current phase is controlled so that the degree of freedom in current phase, which is the number of different current phases per pole, becomes m/(2n+1) at the more-pole drive time and becomes "m" at the less-pole drive time, where "m" represents a natural number that is a multiple of 3 and is equal to or larger than 6, "n" represents a natural number, and m/(2n+1) is equal to or larger than 2.

Accordingly, it is possible to obtain a pole-number-changing rotary electric machine having excellent torque-current characteristics both at the more-pole drive time and at the less-pole drive time without use of a winding changing mechanism, and a driving method of a pole-number-changing rotary electric machine.

Second Embodiment

Figure 6:
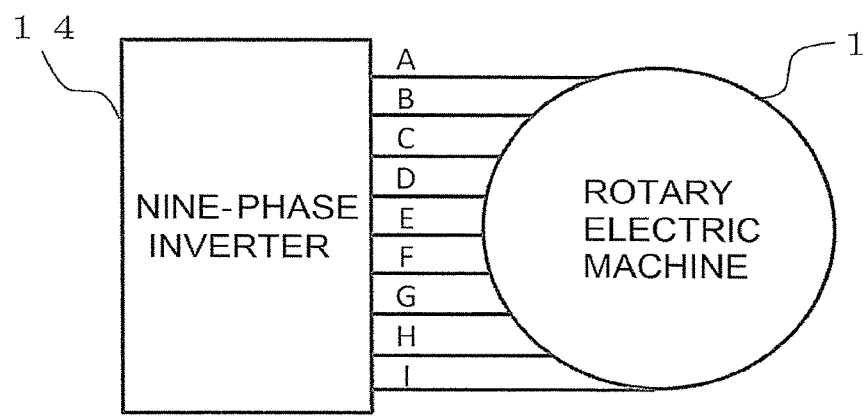
FIG. 6 is a schematic diagram for illustrating a method for wiring connection between a rotary electric machine and an inverter in a pole-number-changing rotary electric machine according to a second embodiment of the present invention.

FIG. 6 is a schematic diagram for illustrating a method for wiring connection between a rotary electric machine and an inverter in a pole-number-changing rotary electric machine according to a second embodiment of the present invention. The pole-number-changing rotary electric machine illustrated in FIG. is different from the pole-number-changing rotary electric machine according to the above-mentioned first embodiment illustrated in FIG. 2 mainly in that a nine-phase inverter 14 supplies a nine-phase current in place of the twelve-phase current and in that the number of stator slots is 36.

First, a description is given of a configuration of the pole-number-changing rotary electric machine according to the second embodiment of the present invention. The stator coil 6 of the rotary electric machine 1 in the second embodiment of the present invention includes nine draw-out ports as illustrated in FIG. 6, and currents having corresponding current phases are supplied from the nine-phase inverter 14.

Figure 7:
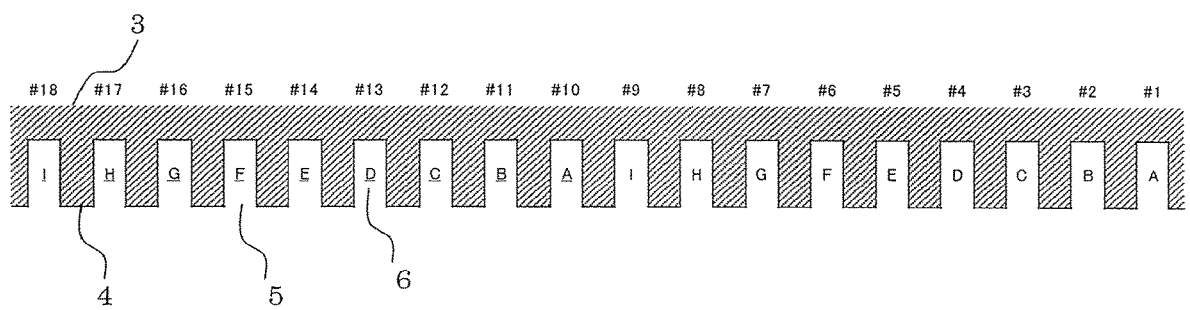
FIG. 7 is a schematic diagram for illustrating a current phase arrangement of stator coils corresponding to eighteen slots in the pole-number-changing rotary electric machine according to the second embodiment of the present invention.

FIG. 7 is a schematic diagram for illustrating a current phase arrangement of stator coils 6 corresponding to eighteen slots in the pole-number-changing rotary electric machine according to the second embodiment of the present invention. In the stator 3, the stator slots 5 having the number of stator slots being 36 are arranged at regular angle intervals in the mechanical angle direction, and the stator coil 6 is stored in each of the stator slots 5.

Next, a description is given of an operation of the pole-number-changing rotary electric machine according to the second embodiment of the present invention. Table 2 is a table for showing an order of current phases of currents supplied to the rotary electric machine 1 by the nine-phase inverter 14 in the pole-number-changing rotary electric machine according to the second embodiment of the present invention.

TABLE 2

|  | Current phase at more-pole drive time | Current phase at less-pole drive time |
| --- | --- | --- |
| Phase-A current | 0° | 0° |
| Phase-B current | 60° | 20° |
| Phase-C current | 120° | 40° |
| Phase-D current | 180° | 60° |
| Phase-E current | 240° | 80° |
| Phase-F current | 300° | 100° |
| Phase-G current | 360° | 120° |
| Phase-H current | 420° | 140° |
| Phase-I current | 480° | 160° |

Figure 8:
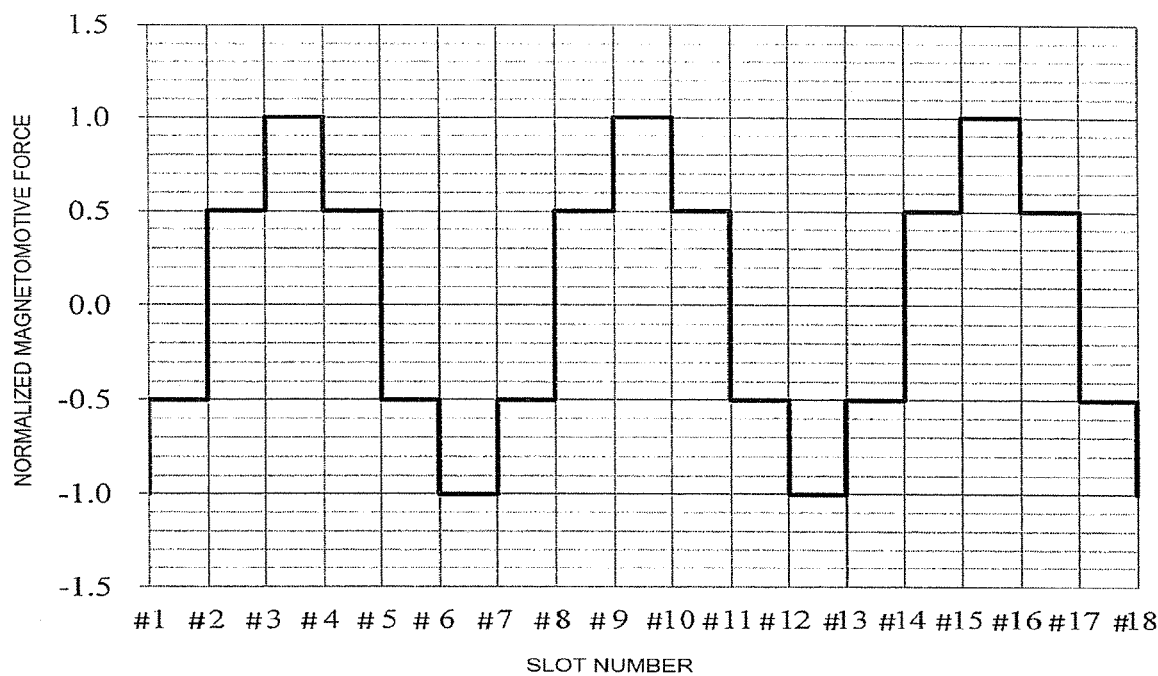
FIG. 8 is a schematic graph for showing a magnetomotive force waveform corresponding to the eighteen slots at a more-pole drive time in the pole-number-changing rotary electric machine according to the second embodiment of the present invention.
Figure 9:
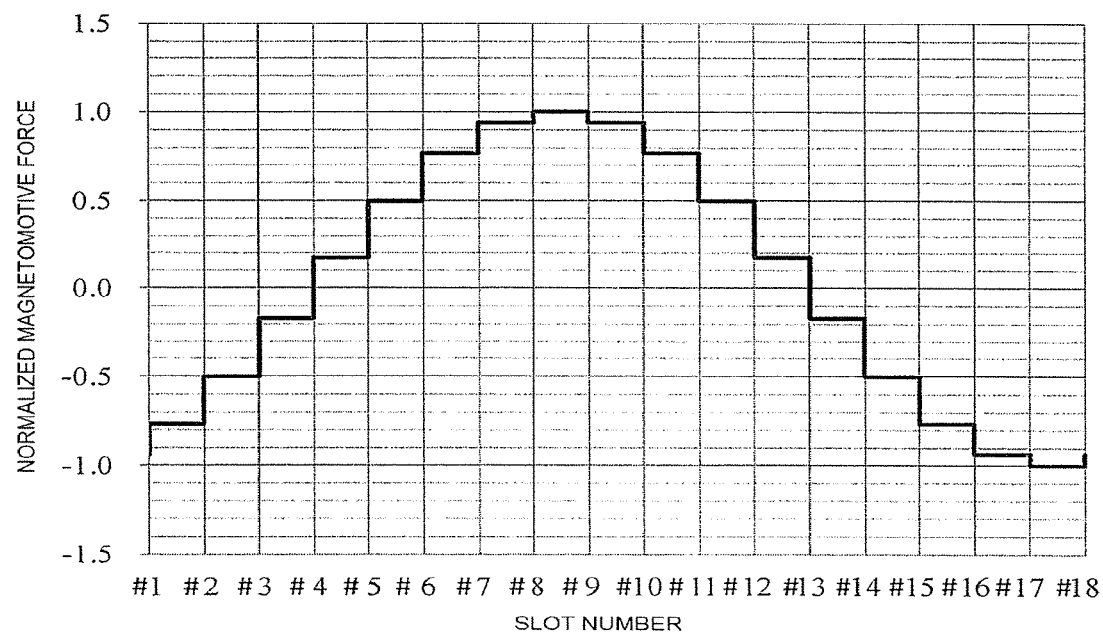
FIG. 9 is a schematic graph for showing a magnetomotive force waveform corresponding to the eighteen slots at a less-pole drive time in the pole-number-changing rotary electric machine according to the second embodiment of the present invention.

Magnetomotive force waveforms obtained when the current phases are controlled based on Table 2 are shown in FIG. 8 and FIG. 9. When a spatial order for a slot half cycle (#1 to #18) is represented by "k" (where "k" represents a natural number), it is understood that the magnetomotive force waveform at a more-pole drive time shown in FIG. 8 exhibits a waveform including mainly a spatial order of 3 k, while the magnetomotive force waveform at a less-pole drive time shown in FIG. 9 exhibits a waveform including mainly a spatial order of "k". This enables the number of poles to be changed so as to satisfy a relationship of (more-pole drive time):(less-pole drive time)=3:1.

In the magnetomotive force waveforms shown in FIG. 8 and FIG. 9, all the stator coils 6 in the stator slots 5 have the same number of coil windings, and currents of I×cos(−60°), I×cos(−120°), I×cos(−180°), I×cos(−240°), I×cos(−300°), I×cos(−360°), I×cos(−420°), I×cos(−480°), and I×cos(−540°) are flowing in the phase A, phase B, phase C, phase D, phase E, phase F, phase G, phase H, and phase I, respectively. In short, all the absolute values of the magnetomotive forces per stator slot 5 generated by the stator coils 6 are the same.

Further, in the second embodiment of the present invention, the number of stator slots is 36, and hence (more poles):(less poles)=(9 poles):(3 poles) is satisfied. The nine-phase inverter 14 performs control to change the current phases of the currents in the phases A to I so as to achieve the order of the current phases shown in Table 2, to thereby be able to form the magnetomotive forces shown in FIG. 8 and FIG. 9.

Next, a description is given of effects of the pole-number-changing rotary electric machine according to the second embodiment of the present invention. The rotary electric machine 1 in the second embodiment of the present invention, which is illustrated in FIG. 7, includes one stator slot per each pole and each phase. That is, the stator coil 6 corresponding to one current phase is stored per slot.

In addition, electrical angles between adjacent slots can be arranged at regular angle intervals both at the more-pole drive time and at the less-pole drive time, and hence a distributed winding coefficient $k_{wd}$ at the more-pole drive time and less-pole drive time in the second embodiment of the present invention is expressed by Expression (1) similarly to the first embodiment. In Expression (1), in the second embodiment of the present invention, q=1 is satisfied both at the more-pole drive time and at the less-pole drive time, and hence the distributed winding coefficient $k_{wd}$ becomes 1.0 both at the more-pole drive time and at the less-pole drive time.

In this manner, in the second embodiment of the present invention, the control unit 16 changes the number of poles so that the ratio between the number of poles at the more-pole drive time and the number of poles at the less-pole drive time becomes (2n+1):1=3:1, and controls the current phase so that the degree of freedom in current phase, which is the number of different current phases per pole, becomes m/(2n+1)=9/2×1+1)=3 at the more-pole drive time and becomes m=9 at the less-pole drive time, where m=9 represents a natural number that is a multiple of 3 and is equal to or larger than 6, n=1 represents a natural number, and m/(2n+1)=3 is equal to or larger than 2, to thereby be able to obtain a pole-number-changing rotary electric machine having excellent torque-current characteristics without use of a winding changing mechanism.

Further, it is possible to improve the distributed winding coefficient due to the current phases between adjacent slots arranged evenly in terms of the electrical angle, to thereby improve torque-current characteristics.

Third Embodiment

Figure 10:
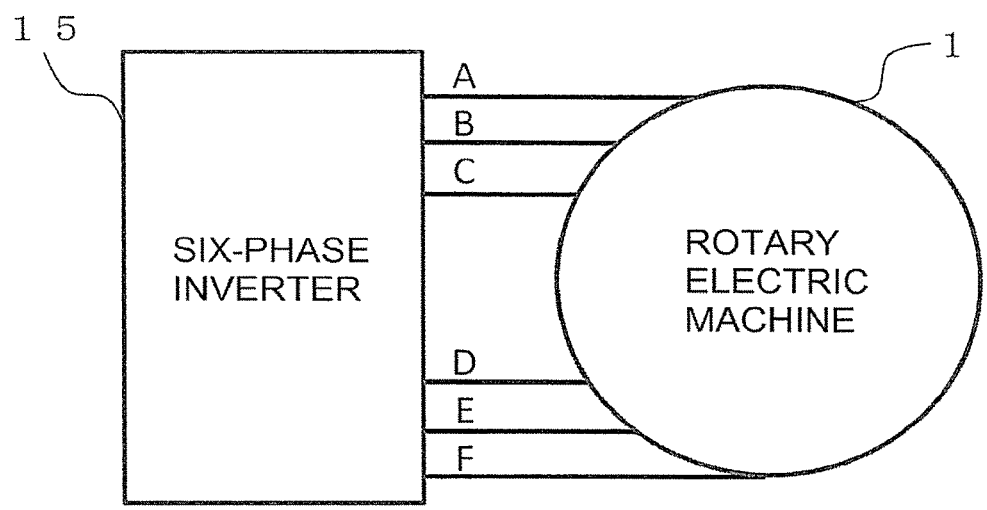
FIG. 10 is a schematic diagram for illustrating a method for wiring connection between a rotary electric machine and an inverter in a pole-number-changing rotary electric machine according to a third embodiment of the present invention.

FIG. 10 is a schematic diagram for illustrating a method for wiring connection between a rotary electric machine and an inverter in a pole-number-changing rotary electric machine according to a third embodiment of the present invention. The pole-number-changing rotary electric machine illustrated in FIG. 10 is different from the pole-number-changing rotary electric machine according to the above-mentioned first embodiment illustrated in FIG. 2 mainly in that a six-phase inverter 15 supplies a six-phase current in place of the twelve-phase current and in that the number of stator slots is 24.

First, a description is given of a configuration of the pole-number-changing rotary electric machine according to the third embodiment of the present invention. The stator coil 6 of the rotary electric machine 1 in the third embodiment of the present invention includes six draw-out ports as illustrated in FIG. 11, and currents having corresponding current phases are supplied from the six-phase inverter 15.

Figure 11:
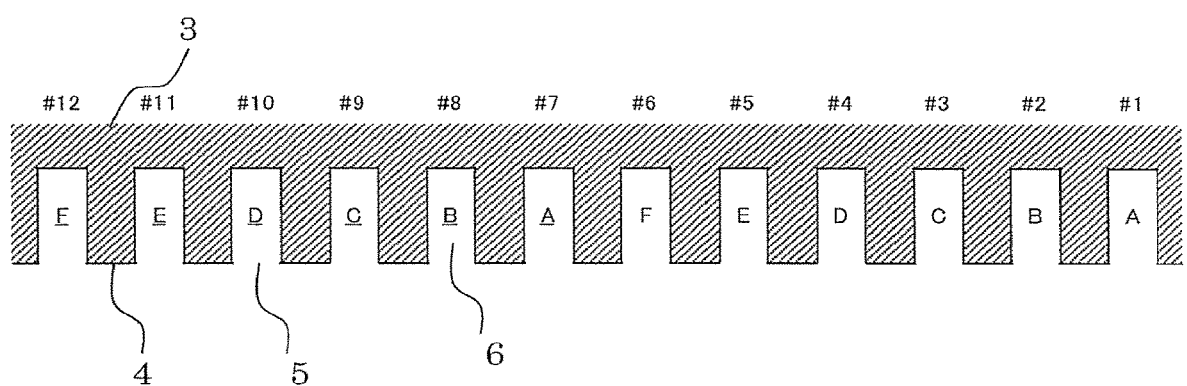
FIG. 11 is a schematic diagram for illustrating a current phase arrangement of stator coils corresponding to twelve slots in the pole-number-changing rotary electric machine according to the third embodiment of the present invention.

FIG. 11 is a schematic diagram for illustrating a current phase arrangement of stator coils 6 corresponding to twelve slots in the pole-number-changing rotary electric machine according to the third embodiment of the present invention. In the stator 3, the stator slots 5 having the number of stator slots being 24 are arranged at regular angle intervals in the mechanical angle direction, and the stator coil 6 is stored in each of the stator slots 5.

Next, a description is given of an operation of the pole-number-changing rotary electric machine according to the third embodiment of the present invention. Table 3 is a table for showing an order of current phases of currents supplied to the rotary electric machine 1 by the six-phase inverter 15 in the pole-number-changing rotary electric machine according to the third embodiment of the present invention.

TABLE 3

|  | Current phase at more-pole drive time | Current phase at less-pole drive time |
| --- | --- | --- |
| Phase-A current | 0° | 0° |
| Phase-B current | 90° | 30° |
| Phase-C current | 180° | 60° |
| Phase-D current | 270° | 90° |
| Phase-E current | 360° | 120° |
| Phase-F current | 450° | 150° |

Figure 12:
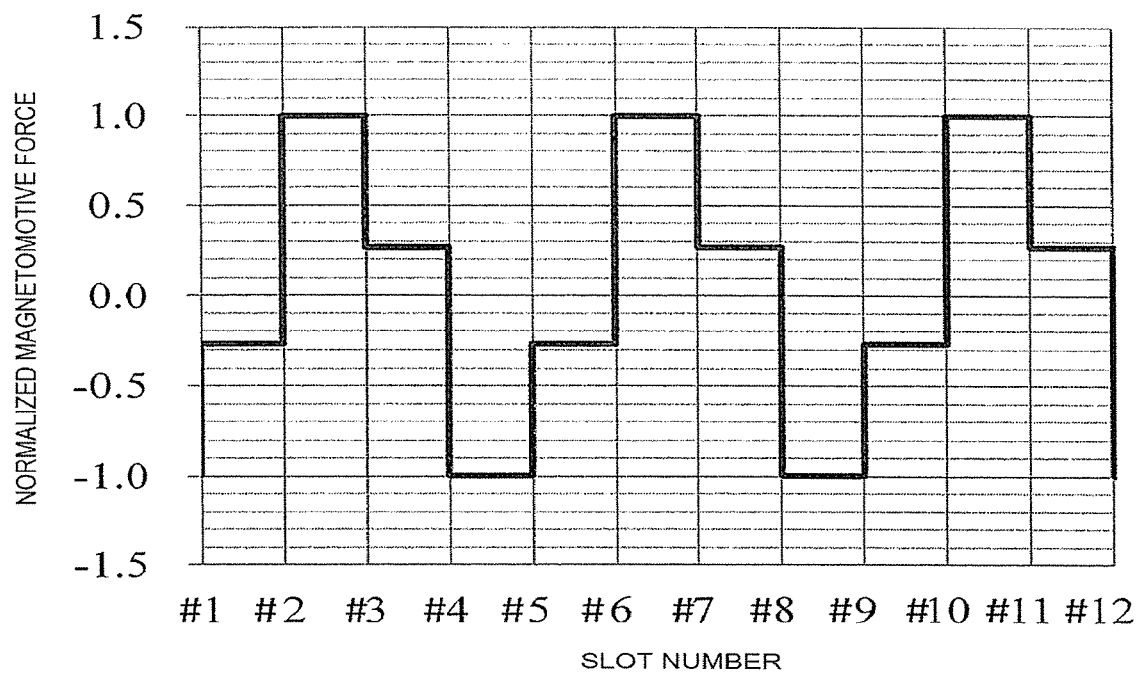
FIG. 12 is a schematic graph for showing a magnetomotive force waveform corresponding to the twelve slots at a more-pole drive time in the pole-number-changing rotary electric machine according to the third embodiment of the present invention.
Figure 13:
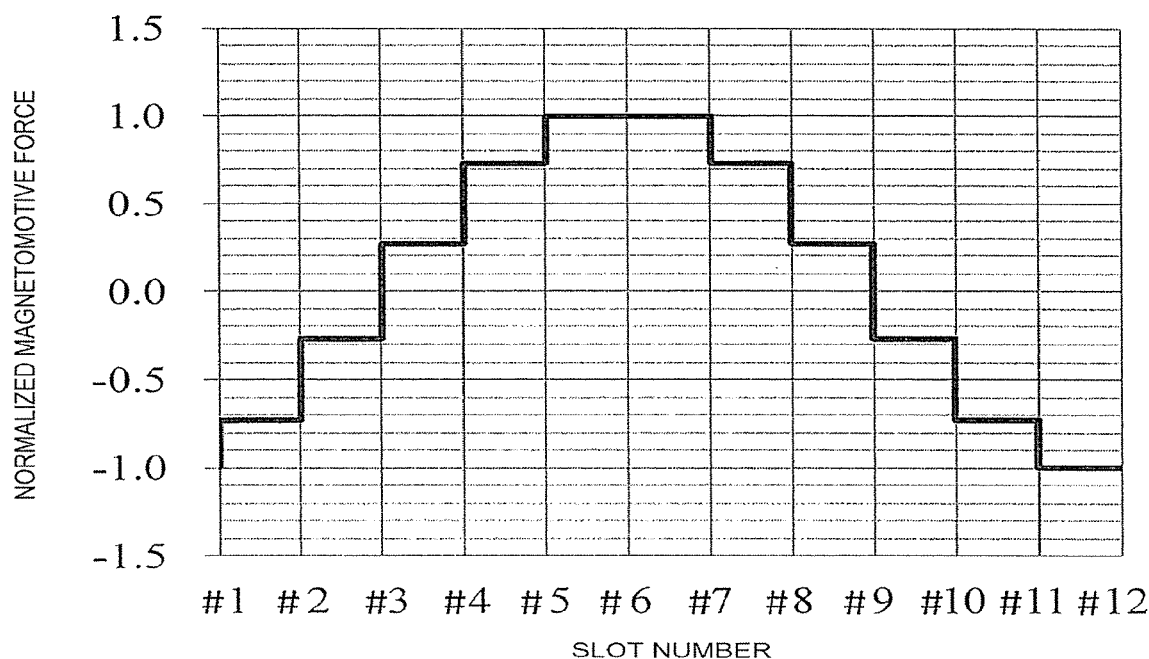
FIG. 13 is a schematic graph for showing a magnetomotive force waveform corresponding to the twelve slots at a less-pole drive time in the pole-number-changing rotary electric machine according to the third embodiment of the present invention.

Magnetomotive force waveforms obtained when the current phases are controlled based on Table 3 are shown in FIG. 12 and FIG. 13. When a spatial order for a slot half cycle (#1 to #12) is represented by "k" (where "k" represents a natural number), it is understood that the magnetomotive force waveform at a more-pole drive time shown in FIG. 12 exhibits a waveform including mainly a spatial order of 3 k, while the magnetomotive force waveform at a less-pole drive time shown in FIG. 13 exhibits a waveform including mainly a spatial order of "k". This enables the number of poles to be changed so as to satisfy a relationship of (more-pole drive time):(less-pole drive time)=3:1.

In the magnetomotive force waveforms shown in FIG. 12 and FIG. 13, all the stator coils 6 in the stator slots 5 have the same number of coil windings, and currents of I×cos(−60°), I×cos(−150°), I×cos(−240°), I×cos(−330°), I×cos(−420°), and I×cos(−510°) are flowing in the phase A, phase B, phase C, phase D, phase E, and phase F, respectively. In short, all the absolute values of the magnetomotive forces per stator slot 5 generated by the stator coils 6 are the same.

Further, in the third embodiment of the present invention, the number of stator slots is 24, and hence (more poles):(less poles)=(6 poles):(2 poles) is satisfied. The six-phase inverter 15 performs control to change the current phases of the currents in the phases A to F so as to achieve the order of the current phases shown in Table 3, to thereby be able to form the magnetomotive forces shown in FIG. 12 and FIG. 13.

Next, a description is given of effects of the pole-number-changing rotary electric machine according to the third embodiment of the present invention. The rotary electric machine 1 in the third embodiment of the present invention, which is illustrated in FIG. 11, includes one stator slot per each pole and each phase. That is, the stator coil 6 corresponding to one current phase is stored per slot.

In addition, electrical angles between adjacent slots can be arranged at regular angle intervals both at the more-pole drive time and at the less-pole drive time, and hence a distributed winding coefficient $k_{wd}$ at the more-pole drive time and less-pole drive time in the third embodiment of the present invention is expressed by Expression (1) similarly to the first embodiment. In Expression (1), in the third embodiment of the present invention, q=1 is satisfied both at the more-pole drive time and at the less-pole drive time, and hence the distributed winding coefficient $k_{wd}$ becomes 1.0 both at the more-pole drive time and at the less-pole drive time.

In this manner, in the third embodiment of the present invention, the control unit 16 changes the number of poles so that the ratio between the number of poles at the more-pole drive time and the number of poles at the less-pole drive time becomes (2n+1):1=3:1, and controls the current phase so that the degree of freedom in current phase, which is the number of different current phases per pole, becomes m/(2n+1)=6/(2 0.1+1)=2 at the more-pole drive time and becomes m=6 at the less-pole drive time, where m=6 represents a natural number that is a multiple of 3 and is equal to or larger than 6, n=1 represents a natural number, and m/(2n+1)=2 is equal to or larger than 2, to thereby be able to obtain a pole-number-changing rotary electric machine having excellent torque-current characteristics without use of a winding changing mechanism.

Further, it is possible to improve the distributed winding coefficient due to the current phases between adjacent slots arranged evenly in terms of the electrical angle, to thereby improve torque-current characteristics.

In the first to third embodiments described above, the stator slots 5 are configured so that $n_s$/m becomes a natural number, where "$n_s$" represents the number of stator slots 5, to thereby be able to cause the number of stator slots per each pole and each phase to become a natural number. Therefore, it is possible to suppress interference between different current phases in the slots.

Further, in the above-mentioned first embodiment, it is assumed that the number of stator slots is 48 and that the number of stator slots per each pole and each phase at the more-pole drive time is 1. However, the present invention is not limited thereto, and any distributed winding coefficient at the more-pole drive time that is expressed by Expression (1) may be employed.

For example, assuming that the number of stator slots is 48 and that the number of stator slots per each pole and each phase at the more-pole drive time is 2, the twelve-phase inverter 2 to be wired may be changed to be connected for each pole pair to achieve the changing of the number of poles between two poles and six poles. The same applies to the second and third embodiments described above.

Further, in the first to third embodiments described above, there are no limitations on the number of rotor slots of the rotor 7 and the number of secondary conductors 11, and the present invention is not limited to the numbers illustrated in FIG. 1. Further, the rotor 7 is not limited to the squirrel-cage rotor illustrated in FIG. 1. When the rotary electric machine 1 is an induction machine, the rotor 7 does not have a magnetic pole by itself, but the present invention can also be applied to a rotor including a permanent magnet or other such magnet therein to have a magnetic pole by itself.

The invention claimed is:

1. A pole-number-changing rotary electric machine, which is configured to change a number of poles between a more-pole drive time and a less-pole drive time, the pole-number-changing rotary electric machine comprising:
a rotary electric machine including:
a stator including stator slots arranged in a mechanical angle direction; and
a rotor configured to be rotated by magnetomotive forces generated by currents flowing through stator coils stored in the stator slots;
an inverter configured to supply an m-phase current to the stator coils; and
a control unit configured to control the inverter,
the per-stator-slot magnetomotive forces being arranged at regular angle intervals,
wherein the control unit is configured to:
change the number of poles so that a ratio between the number of poles at the more-pole drive time and the number of poles at the less-pole drive time becomes (2n+1):1; and
control a current phase so that a degree of freedom in current phase, which is a number of different current phases per pole, becomes m/(2n+1) at the more-pole drive time and "m" at the less-pole drive time, where "m" represents a natural number that is a multiple of 3 and is equal to or larger than 6, "n" represents a natural number, and m/(2n+1) is equal to or larger than 2; and
control the current phase of each of currents flowing through the stator coils at the more-pole drive time or at the less-pole drive time so that angle intervals between each pair of current phases of the currents flowing through the stator coils in the stator slots adjacent to each other are the same in terms of an electrical angle, to thereby cause a distributed winding coefficient at the more-pole drive time to become 1 and a distributed winding coefficient at the less-pole drive time to become 1.

2. The pole-number-changing rotary electric machine according to claim 1, wherein $n_s$/m is a natural number, where "$n_s$" represents a number of stator slots.

3. The pole-number-changing rotary electric machine according to claim 1, wherein m=6 and n=1 are satisfied.

4. The pole-number-changing rotary electric machine according to claim 1, wherein m=9 and n=1 are satisfied.

5. The pole-number-changing rotary electric machine according to claim 1, wherein m=12 and n=1 are satisfied.

6. The pole-number-changing rotary electric machine according to claim 1, wherein the control unit is configured to control the current phase so as to change the number of poles in accordance with a rotation speed of the rotor of the rotary electric machine.

7. The pole-number-changing rotary electric machine according to claim 1, wherein the rotary electric machine includes an induction machine.

8. The pole-number-changing rotary electric machine according to claim 1, wherein the control unit is configured to control the inverter to change the number of poles so that the ratio between the number of poles at the more-pole drive time and the number of poles at the less-pole drive time becomes (2n+1):1 by changing an output current phase of the inverter.

9. A driving method of a pole-number-changing rotary electric machine, which is configured to change a number of poles between a more-pole drive time and a less-pole drive time, the pole-number-changing rotary electric machine including:
 a rotary electric machine including:
  a stator including stator slots arranged in a mechanical angle direction; and
  a rotor configured to be rotated by magnetomotive forces generated by currents flowing through stator coils stored in the stator slots;
 an inverter configured to supply an m-phase current to the stator coils; and
 a control unit configured to control the inverter,
  the per-stator-slot magnetomotive forces being arranged at regular angle intervals, the method comprising a current supplying step of supplying, by the control unit, an in-phase current to the stator coils through use of the inverter, wherein the current supplying step includes:

changing the number of poles so that a ratio between the number of poles at the more-pole drive time and the number of poles at the less-pole drive time becomes (2n+1):1;

controlling a current phase so that a degree of freedom in current phase, which is a number of different current phases per pole, becomes m/(2n+1) at the more-pole drive time; and controlling the current phase so that the degree of freedom in current phase becomes "m" at the less-pole drive time, where "m" represents a natural number that is a multiple of 3 and is equal to or larger than 6, "n" represents a natural number, and m/(2n+1) is equal to or larger than 2; and controlling the current phase of each of currents flowing through the stator coils at the more-pole drive time or at the less-pole drive time so that angle intervals between each pair of current phases of the currents flowing through the stator coils in the stator slots adjacent to each other are the same in terms of an electrical angle, to thereby cause a distributed winding coefficient at the more-pole drive time to become 1 and a distributed winding coefficient at the less-pole drive time to become 1.

10. The driving method of a pole-number-changing rotary electric machine according to claim 9, wherein the current supplying step includes changing the number of poles in accordance with a rotation speed of the rotor of the rotary electric machine.

* * * * *